Dec. 3, 1968     K. W. FRYE     3,414,293
BICYCLE GEAR
Filed April 24, 1967     2 Sheets-Sheet 1
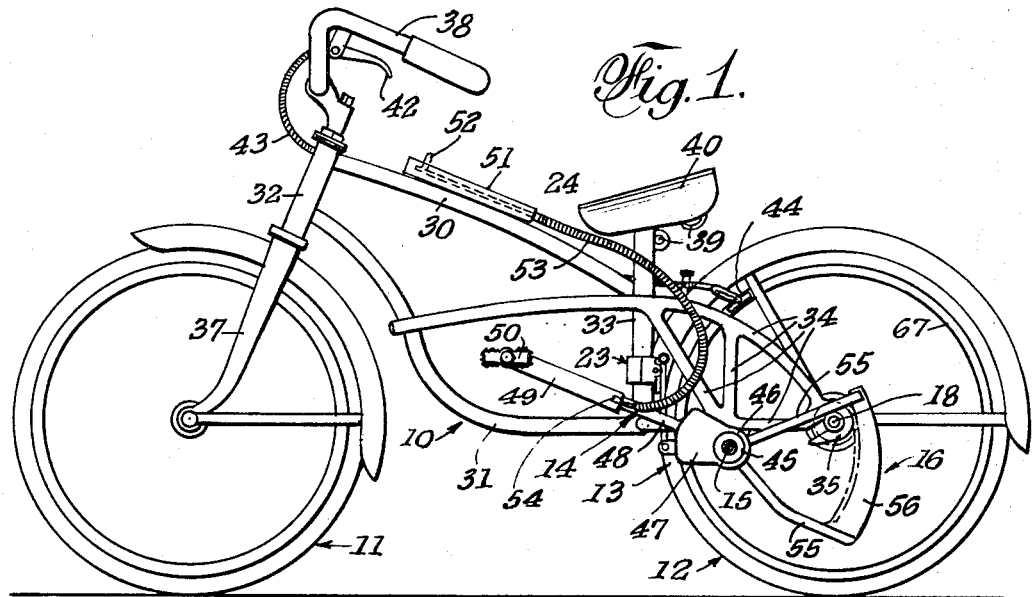
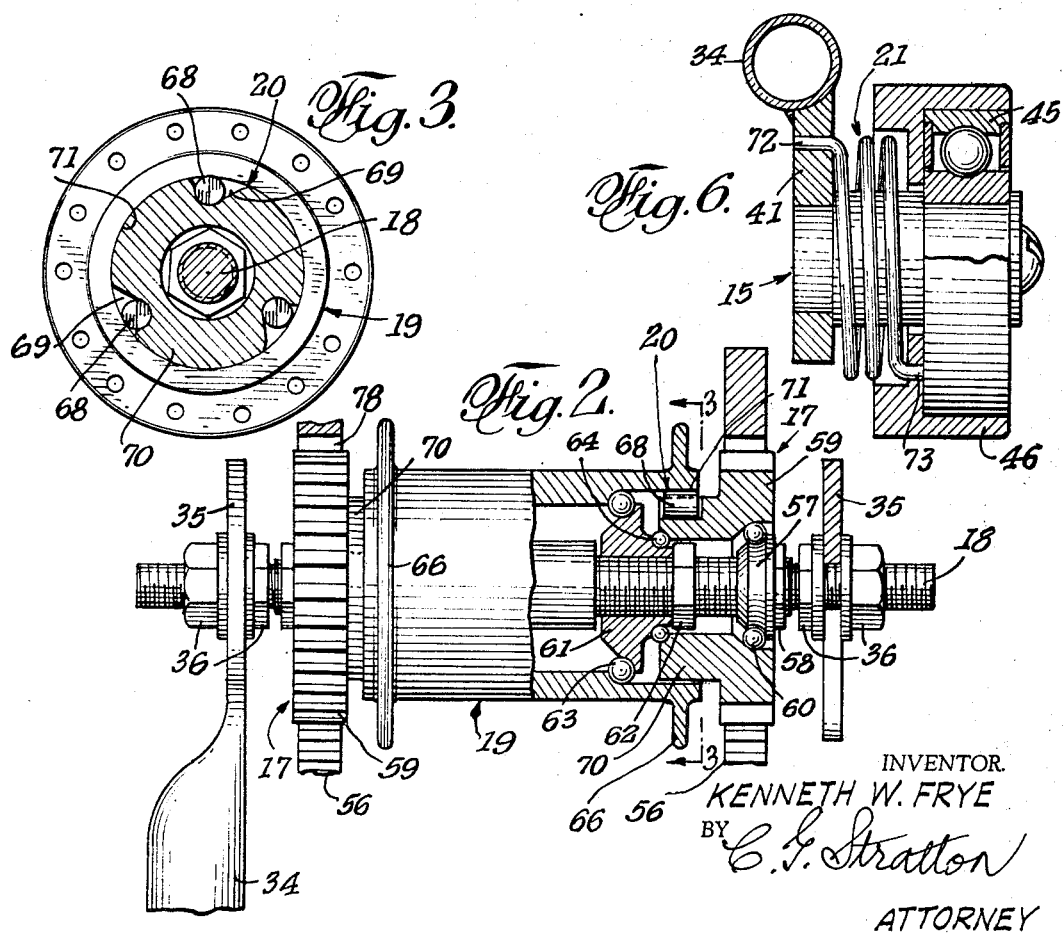
INVENTOR.
KENNETH W. FRYE
BY C. J. Stratton
ATTORNEY

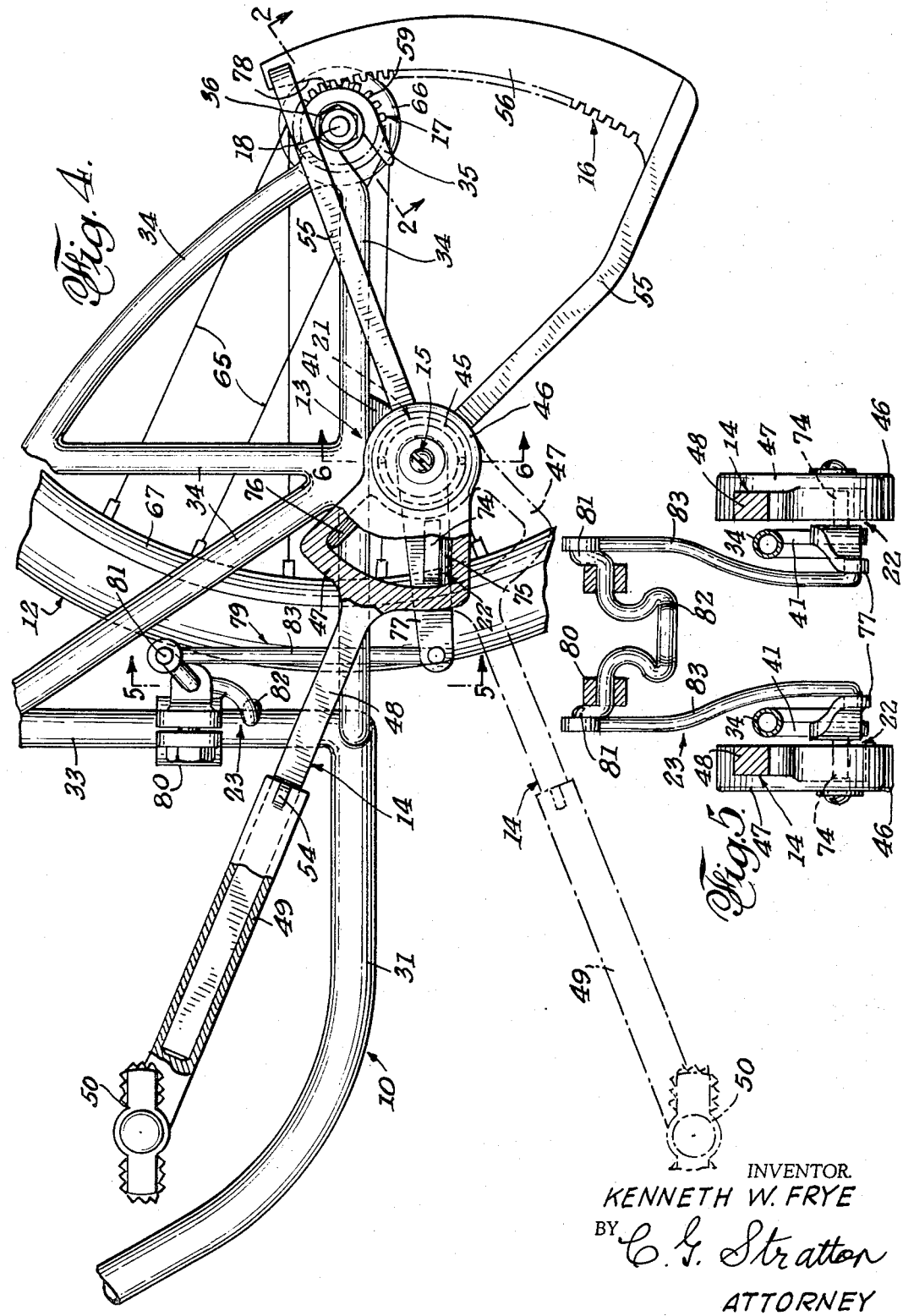

3,414,293
BICYCLE GEAR
Kenneth W. Frye, South Pasadena, Calif.
(2117 Lemon St., Alhambra, Calif. 91803)
Filed Apr. 24, 1967, Ser. No. 633,240
7 Claims. (Cl. 280—254)

ABSTRACT OF THE DISCLOSURE

Bicycle gear having pivoted treadle-like pedals that forwardly drive the rear wheel of a bicycle through a one-direction clutch so the wheel is free to continue to turn forwardly upon recovery movement of the pedals, which are arranged to move through an arc of about 45°. The pedals, in the general organization of a conventional bicycle frame and wheels, being arranged to move between high and low positions on either side of the horizontal. The gear includes means to extend the effective length of the treadles for increased power on upgrades.

Cross-references to related applications

None.

Background of the invention

The chain-and-sprocket drive common to conventional bicycle requires pedals that are rotated by the feet, such pedal movement utilizing substantially less than half of the foot movement to produce driving power. In practice, only the angle of pedal movement that is effective for efficient driving extends between a few degrees beyond top dead center and a few degrees beyond the horizontal. The remainder of the pedal movement either entails recovery movement or is carried out with but little power efficiency. Nonetheless, the feet must continue their constant drive movement for the full revolutions of the pedal. Such excessive foot movement is quite inefficient, and is unnecessarily tiring to the cyclist.

Recognizing the above faults in conventional chain-and-sprocket bicycle gear, an object of this invention is to provide bicycle gear that, by utilizig only the most efficient pivotal, reciprocative movement of drive pedals, is efficient to drive the rear wheel of a bicycle merely by a foot movement that is between about ten to twelve inches, and wherein the full downward movement of the foot is used for propulsion and the return or recovery foot movement may be leisurely effected during coasting movement of the bicycle instituted by said downward movement. The present operation, therefore, is less tiring than those entailing foot movement that follows pedal rotation.

The present invention also provides for simple means to obtain increased power for negotiating upgrades, and also for obtaining increased speed.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawings. However, said drawings merely show, and the following description merely describes, one embodiment of the present invention, which is given by way of illustration or example only.

Summary of the invention

A bicycle having a frame 10, a front steerable wheel 11, and a rear wheel 12, is provided with the drive gear 13 for driving said drive gear that is operable by the feet of a person seated upon said frame. Said gear 13 comprises, generally, a pair of treadle-like pedal means 14 mounted on the frame 10 on aligned, transversely spaced, pivotal axes 15, a drive segment 16 affixed to each said pedal and extending oppositely from said axis 15, driven means 17 operatively engaged with the segments 16 and mounted on an axle 18 affixed to the frame 10, a hub 19 on said rear wheel and rotationally mounted on said axle 18, a one-direction clutch 20 interengaging the driven means 17 and said hub 19 to drive the latter and the rear wheel 12 in a forward direction during downward movement of one or both of the pedals 14 and to permit the rear wheel to rotate forwardly freely, i.e., to coast at the end of such pedal movement, spring means 21 to return said pedals 14 to raised position during such coasting, means 22 to limit the pedal movement, means 23 to adjust the positions of the segments 16 so the same release their engagement with the driven means 17, thereby enabling reverse or backward rotation of the rear wheel 12, and means 24 to regulate the effective length of the pedals 14 for increased speed and power.

In the drawings, like reference characters designate similar parts in the several views.

Brief description of the drawings

FIG. 1 is a side elevational view of a bicycle provided with operating gear according to the invention.

FIG. 2 is an enlarged cross-sectional view as taken on the line 2—2 of FIG. 4 and showing the one-direction drive means of said operating gear.

FIG. 3 is a cross-sectional view as taken on the line 3—3 of FIG. 2, showing the one-direction clutch of said drive means.

FIG. 4 is a fragmentary side elevational view, partly in section, showing the operating gear to a larger scale than in FIG. 1.

FIG. 5 is a cross-sectional view as taken on the line 5—5 of FIG. 4, showing means for effecting wheel-releasing adjustment of the drive means of the operating gear.

FIG. 6 is a cross-sectional view as taken on line 6—6 of FIG. 4, showing the mounting axis of the operating gear.

Description of the preferred embodiment

The frame 10 is formed of generally conventional longitudinal tubular members 30 and 31 that, at the front, are connected to a bearing tube 32, more rearwardly, are connected to a vertical tube 33, and at the rear, are connected to the fixed fork members 34 between which the rear wheel 12 is housed. As best seen in FIGS. 2 and 4, said fork members 34 terminate in open bearings 35 in which the axle 18 is engaged and replaceably secured by nuts 36. Said axle spans between said bearings 35 and, per se, may be quite conventional.

The mentioned bearing tube 32 steerably mounts the fork 37 for the front wheel 11, the usual handlebars 38 being provided for steering said wheel. The mentioned tube 33, in a conventional manner, is provided with a mount 39 for a saddle 40 above and forward of the rear wheel 12. Brackets 41 are provided on the lower portion of the fork members 34, the mentioned pivotal axis 15 extending transversely. FIG. 1 shows a typical brake mechanism for the rear wheel, the same comprising the usual control lever 42, a Bowden wire 43, and a pair of brake shoes 44 controlled by movement of said wire to frictionally engage the felly 67 of the wheel 12 to retard the rotational speed of said wheel.

The pedal means 14 is provided one on each side of the frame 10; said means is shown as a bearing 45 mounted on the axis 15 and housed in a cup 46 that has a forward extension housing 47 from which forwardly extends an arm 48. Said housing 47, covered at the outside, is open on the inside. Said pedal means 14 may include a tubular member 49 slidably but non-rotationally mounted on the arm 48 and provided at its end with a foot pedal 50. The means 24 is provided for adjusting the member 49 on the arm 48 of each pedal means 14.

The means 24 is shown as a slide casing 51 which may be mounted on the frame tube 30 for ready access, an adjuster knob 52 longitudinally settable along said casing, a Bowden wire 53 connected to said knob and which may be bifurcated so one wire end or leg is attached, at 54, to each member 49, whereby the knob 52 may be used to extend or retract said members to lengthen or shorten the pedals accordingly.

The drive segment 16 of each of the pedal means is shown as a pair of arms 55 and a gear section 56 extending between the ends of said arms. In this case, the teeth of said gear section are internal teeth for engagement with the means 17. The axle 18, therefore, is located between the axis 15 and said gear section 56.

The driven means 17 engaged with each drive segment 16 is shown as an inner bearing race 57 threadedly mounted on the axle 18 and locked thereon by a nut 58, and a pinion gear 59 mounted on said race with a ball bearing 60 interposed therebetween.

The hub 19 is shown as a sleeve disposed between the gears 59 and is mounted on inner bearing races 61 threadedly on said axle 18 between the races 57 and locked thereon by nuts 62. A ball bearing 63 is interposed between said races 61 and the inner bore of the sleeve 19. Said inner races 61 also serve to engage the inner portions of the gears 59, a ball bearing 64 being provided where said races and gears engage.

It will be clear from the above that both gears 59 and the hub 19 are mounted on the axle 18 for free rotation due to the bearings 60, 63 and 64, and that the rear wheel 12 is rotationally mounted since the spokes 65 extend from the flanges 66 on said hub and connect with the felly 67.

The one-direction clutch 20 interconnects said gears 59 and the ends of the hub 19 in a manner to cause either gear or both of them, when forwardly rotated by either or both drive segments 16 upon depression of either or both pedals 14, to rotate the wheel 12 in a forward direction only. At all other times, the wheel 12 may be rotated in a forward direction, as when moving the same along the ground, or is under free forward rotation, as when the bicycle is coasting forwardly. Said clutch 20 is shown as a plurality of rollers 68 nested in cam recesses 69 in the boss 70 of each gear 59 and in rolling or gripping engagement with the inner face 71 of the hub 19. Said recesses 69 are so formed that the rollers are gripped between the cam faces of the recesses and said face 71 to provide a drive engagement, and are free to roll when they are moved into the non-camming roller-housing portions of the recesses.

The spring means 21 is preferably concealed in each cup 46 and is of spiral form with one end 72 affixed to the bracket 41 and the other end 73 to the cup adjacent its outer edge. Said spring is biased to raise the pedals 14 after the same have been depressed by foot action.

The means 22 is shown as a lug 74 that extends into the housing 47 which is an extension of the cup 46. Angularly oppositely disposed pads 75 and 76 within said housing alternately engage the opposite sides of said lug 74 to limit the top and bottom positions of the pedals. In practice, said lug may comprise a fixed abutment affixed to the frame 10. In this case, it is provided on an arm 77 either on the pivotal axis 15 or on an adjacent pivot.

The means 23 comprises a portion 78 beyond the upper end of the teeth on each gear section 56, and means 79 for raising the lugs 74 on each side, thereby allowing the spring means 21 to move the pedals 14 beyond their normal raised position, thereby bringing the mentioned gear section portions 78 opposite the teeth of the gears 59 and disconnecting said gears from the gear sections 56.

Any suitable means may be provided for shifting the lugs 74. In this case, the means 79 comprises a bracket 80 mounted on the member 33 of the frame 10 and provided with over-center levers 81 journalled in said bracket, and provided with a handle 82 to move said levers between raised and lowered positions, and links 83 extending between the arms 77 and the levers 81. With the arms 77 non-movable in both positions, the lugs 74 constitute fixed stops for the present pedal gear.

It will be evident that restoring the gear to normal drive position is accomplished with little or no clash of gear teeth, since the gears 59 are not clutched to the hub 19 when the bicycle is coasting and there is no turning moment that is effective to rotate said gears until the gear sections 56 are moved by foot operation of the pedals.

Having thus described the invention, what is claimed and desired to be secured by Letters Patent is:

1. In a bicycle having a frame and a rear wheel having a hollow hub with a fixed axle fixed in said frame and rotationally mounting said wheel:
    (a) aligned pivotal axes forward of the mentioned axle and on opposite sides of said rear wheel,
    (b) drive gear means pivotally mounted on each said axes and integrally comprising,
        (1) a forwardly directed pedal, and
        (2) a rearwardly directed drive segment,
    (c) a stop to limit the upper and lower limits of movement of each pedal,
    (d) spring means to return said pedals to upper position after depression thereof to lower position, and
    (e) a one-direction clutch means operatively connecting each drive segment and the adjacent end of the wheel hub to forwardly rotate said hub and the wheel thereon upon foot depression of either of said pedals and, thereby, propel the bicycle forwardly.

2. In a bicycle according to claim 1, means to operatively disconnect each drive segment from the respective clutch means, and means to raise the upper limit of the pedals accordingly and, thereby, releasing the rear wheel and its hub for free rotation in a backward direction.

3. In a bicycle according to claim 1, means to increase the operative length of the pedals to increase the speed and power of the bicycle.

4. In a bicycle according to claim 3 in which the length-increasing means comprises:
    (a) a slidable extension on each pedal and having a foot pedal,
    (b) a Bowden wire connected to each said extension at one end and to each other at the opposite end, and
    (c) means to adjustably move the connected end of the Bowden wire.

5. In a bicycle according to claim 1, a housing part adjacent the pivoted end of each pedal, and the mentioned stop being disposed in said housing part and adapted for alternate engagement with angularly opposite portions of said housing part.

6. In a bicycle according to claim 1, each said clutch means including a plurality of clutch rollers adapted for rolling and frictional engagement with the wheel hub.

7. In a bicycle according to claim 1:
(a) each drive segment being provided with an arcuate gear section,
(b) a pinion gear having a boss and engaged with said section and rotationally mounted on said axle, and
(c) the one-direction clutch comprising,
 (1) cam recesses formed in the periphery of the gear boss, and
 (2) a plurality of clutch rollers disposed in said recesses and in rolling and frictional engagement with the inner face of the hollow sub.

References Cited

UNITED STATES PATENTS

| | | | |
|---|---|---|---|
| 608,674 | 8/1898 | Harshner | 280—257 |
| 713,867 | 11/1902 | Forster | 280—254 X |
| 853,112 | 5/1907 | Peters | 280—254 X |
| 1,148,419 | 7/1915 | White | 280—254 |
| 2,630,333 | 3/1953 | Petersen | 280—255 |
| 2,831,703 | 4/1958 | Shrimpton | 280—254 |

KENNETH H. BETTS, *Primary Examiner.*